United States Patent
Hsiao et al.

(10) Patent No.: US 8,469,714 B2
(45) Date of Patent: Jun. 25, 2013

(54) ABDOMINAL BREATHING TRAINING APPARATUS, ABDOMINAL BREATHING TRAINING SYSTEM AND METHOD THEREOF

(75) Inventors: Tzu-Chien Hsiao, Hsinchu (TW); Ru-Shin Hsu, Miaoli County (TW); Dai-Ling Hsieh, Tainan County (TW)

(73) Assignee: National Chiao Tung University, Hsinchu (TW)

( * ) Notice: Subject to any disclaimer, the term of this patent is extended or adjusted under 35 U.S.C. 154(b) by 637 days.

(21) Appl. No.: 12/701,512

(22) Filed: Feb. 5, 2010

(65) Prior Publication Data

US 2011/0195387 A1    Aug. 11, 2011

(51) Int. Cl.
*A63B 23/02* (2006.01)
*G09B 19/00* (2006.01)

(52) U.S. Cl.
USPC .............................................. 434/262; 482/13

(58) Field of Classification Search
USPC .............. 434/262, 265; 600/534, 529; 482/13
See application file for complete search history.

(56) References Cited

U.S. PATENT DOCUMENTS

| | | | | |
|---|---|---|---|---|
| 4,665,926 A | * | 5/1987 | Leuner et al. | 600/529 |
| 4,798,538 A | * | 1/1989 | Yagi | 434/262 |
| 5,076,281 A | * | 12/1991 | Gavish | 600/534 |
| 5,353,788 A | * | 10/1994 | Miles | 128/204.23 |
| 5,857,984 A | * | 1/1999 | deBoer et al. | 600/595 |
| 6,042,509 A | * | 3/2000 | Wu et al. | 482/13 |
| 6,662,032 B1 | * | 12/2003 | Gavish et al. | 600/323 |
| 7,351,208 B2 | | 4/2008 | Brodnick et al. | |
| 2009/0227425 A1 | * | 9/2009 | Shirasaki et al. | 482/8 |

FOREIGN PATENT DOCUMENTS

TW    200920436    5/2009

OTHER PUBLICATIONS

Chun-I Sun, "Design and Fabrication a Belt for Abdominal Breathing," with English Abstract in p. 3, Theses of National Taipei University of Technology, Jul. 2009, pp. 1-97.

* cited by examiner

*Primary Examiner* — Kang Hu
(74) *Attorney, Agent, or Firm* — Jianq Chyun IP Office

(57) ABSTRACT

An abdominal breathing training apparatus, an abdominal breathing training system and the method thereof are provided. The abdominal breathing training apparatus is adapted for training a trainee how to perform an abdominal breathing and includes a trainer unit, a sensor unit, a data acquisition and conversion unit and a display unit. The trainer unit generates training waveforms and indications. The sensor unit directly measures abdominal movement signals from the trainee, and is positioned adjacent to the abdominal portion of the trainee. The data acquisition and conversion unit is coupled to the sensor unit and generates a trainee abdominal movement waveform according to the measured abdominal movement signals of the trainee. The display unit is coupled to the trainer unit, and displays the training waveforms and the indications to the trainee, who follows the training waveforms on the display unit to perform the abdominal breathing.

19 Claims, 3 Drawing Sheets

ABDOMINAL BREATHING TRAINING APPARATUS, ABDOMINAL BREATHING TRAINING SYSTEM AND METHOD THEREOF

BACKGROUND

1. Technical Field

The invention generally relates to a breathing training apparatus, and more particularly, to an abdominal breathing training apparatus, an abdominal breathing training system and a method thereof.

2. Related Art

Abdominal breathing is an important rehabilitation exercise for physiological treatments. More air can be breathed in by performing the abdominal breathing than performing a thoracic respiration. Therefore, the oxygen utilization is increased by breathing. Besides, the abdominal breathing is also a physiological training approach beneficial for relaxing people and releasing stresses of people. For example, the patient after a lung surgery or a heart surgery, the patient of asthma and the patient of pulmonary edema are usually required to practice the abdominal breathing in order to enhance weak breathing capability after the surgery or improve breathing frequency and breathing intensity.

Regarding mental treatments, symptoms of the patient with phobia disorder and panic disorder or other body and mind disorder situation caused psychologically can be reduced when the patient performs the abdominal breathing. Besides, a medical practitioner can determine the body and mind condition of the patient by monitoring the abdominal breathing situation of the patient, and thus assist the patient to keep a balanced body and mind condition through such a physiological feedback mechanism. With respect to health care, performing the abdominal breathing is simple, easily implemented, and beneficial for releasing stresses but not limited to time, location, space or equipments. In other words, the abdominal breathing is also good for a person to maintain a good body and mind condition.

In order to have advantages of the abdominal breathing, the person is required to perform the abdominal breathing correctly. Usually, the person practicing the abdominal breathing needs a professional medical practitioner accompanies the person. The professional medical practitioner normally monitors the abdominal breathing process by placing a hand on the person's abdomen and provides correction instructions. This training approach is reliable but not economical since the person who performs the abdominal breathing cannot practice by himself/herself.

Clinically, conventional or common breathing training methods may use standard physiological values or physiological measurement values to determine whether the breathing training is correct or effective. For example, a Forced Vital Capacity (FVC) through a spirometer measurement, a Forced Expiratory Volume in the first second (FEV1), a Functional Residual Capacity (FRC) and Total Lung Capacity (TLC) are common physiological measurement values used in the breathing training. However, those clinical measurement values cannot directly evaluate the effects of the abdominal breathing. There are other techniques developed for determining an effectiveness of the abdominal breathing training. For example, a body surface potential which indicates a variation of heart beats can be applied to acquire the breathing frequency through specific signal processing. Also, training interfaces are designed to measure breathing physiological data for a professional medical practitioner to determine whether the user/the patient is correctly performing the abdominal breathing, and further inform a user/the patient of his/her own abdominal breathing condition. However, the aforementioned physiological measurement values are not directly designed for or directly measured from the abdominal breathing. Besides, the aforementioned training interfaces or physiological measurements usually require bulky or inconvenient equipments such as a breathing mask or a set of sensing patches. There is currently no physiological measurement equipment which directly measures the abdominal breathing values and further providing feedback or indications for the user/the patient adjust his/her abdominal breathing process as the user/the patient can perform/practice the abdominal breathing on his/her pace.

SUMMARY

Accordingly, the invention provides an abdominal breathing training apparatus, an abdominal breathing training system and a method thereof. The abdominal breathing training apparatus determines an abdominal breathing condition of a user/a trainee by comparing a current abdominal movement waveform directly measured from the user/the trainee with a regular abdominal breathing waveform while there is no professional trainer accompanying the user/the trainee. Besides, the abdominal breathing training apparatus provides a training interface to assist the user/the trainee adjust his/her own abdominal breathing condition. Thus, the user/the trainee may gradually and correctly develop an abdominal breathing habit on his/her own pace. Other objectives and advantages of the invention can be further understood from technical features disclosed in the invention.

In consistent with an exemplary embodiment of the invention, the invention proposes an abdominal breathing training apparatus. An abdominal breathing training apparatus is adapted for training a trainee how to perform an abdominal breathing and includes a trainer unit, a sensor unit, a data acquisition and conversion unit and a display unit. The trainer unit generates training waveforms and indications. The sensor unit directly measures a plurality of abdominal movement signals from the trainee, where the sensor unit is positioned adjacent to the abdominal portion of the trainee. The data acquisition and conversion unit is electrically coupled to the sensor unit and the trainer unit, and generates a trainee abdominal movement waveform according to the measured abdominal movement signals of the trainee. The display unit is electrically coupled to the trainer unit, and displays the training waveforms and the indications to the trainee, where the trainee follows the training waveforms on the display unit to perform the abdominal breathing.

In consistent with an exemplary embodiment of the invention, the invention proposes an abdominal breathing training system. The abdominal breathing training system is adapted for training a trainee how to perform an abdominal breathing and includes a trainer unit, a sensor unit, an analog-to-digital conversion unit, a communication unit and a display apparatus. The trainer unit generates training waveforms and indications. The sensor unit directly measures a plurality of abdominal movement signals from the trainee, where the sensor unit is positioned adjacent to the abdominal portion of the trainee. The analog-to-digital conversion unit is electrically coupled to the sensor unit and the trainer unit, and generates a trainee abdominal movement waveform according to the measured abdominal movement signals of the trainee. The communication unit is electrically coupled to the trainer unit, and transmits the training waveforms and the indications from the trainer unit to a display apparatus. The display apparatus is coupled to the communication unit, and configured to display the training waveforms and the indications to the trainee, where the trainee follows the training waveforms on the display apparatus to perform the abdominal breathing.

In consistent with an exemplary embodiment of the invention, the invention proposes an abdominal breathing training method. The abdominal breathing training method is adapted for training a trainee how to perform an abdominal breathing. The abdominal breathing training method includes the following steps. Training waveforms and indications are generated. Besides, a plurality of abdominal movement signals are directly measured from the trainee. Moreover, a trainee abdominal movement waveform is generated according to the measured abdominal movement signals. Furthermore, the training waveforms and the indications are displayed or provided to the trainee, where the trainee follows the training waveforms to perform the abdominal breathing.

It is to be understood that both the foregoing general description and the following detailed description are exemplary, and are further intended to provide the explanation of the present disclosure as claimed.

BRIEF DESCRIPTION OF THE DRAWINGS

The accompanying drawings are included to provide a further understanding of the invention, and are incorporated in and constitute a part of this specification. The drawings illustrate embodiments of the invention and serve to explain the principles of the invention together with the description.

DESCRIPTION OF THE EXEMPLARY EMBODIMENTS

Figure 1:
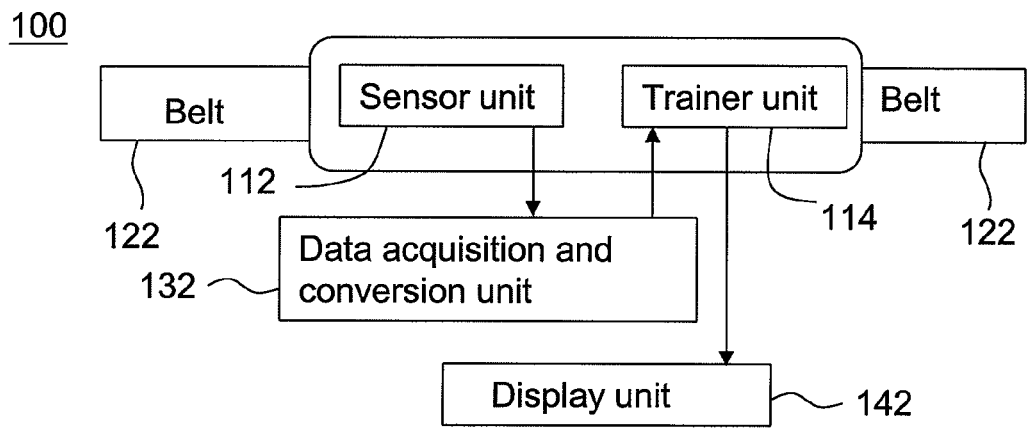
FIG. 1 is a block diagram illustrating an abdominal breathing training apparatus according to an exemplary embodiment of the invention.

Reference will now be made in detail to the exemplary embodiments of the invention, examples of which are illustrated in the accompanying drawings. Wherever possible, the same reference numbers are used in the drawings and the description to refer to the same or like parts.

FIG. 1 is a block diagram illustrating an abdominal breathing training apparatus 100 according to an exemplary embodiment of the invention. Referring to FIG. 1, the abdominal breathing training apparatus 100 includes a sensor unit 112, a trainer unit 114, a data acquisition and conversion unit 132, a display unit 142 and two belts 122. The abdominal breathing training apparatus 100 is adapted for training a trainee/a user how to perform an abdominal breathing. The trainee is hereinafter referred to as the user of the abdominal breathing training apparatus 100 throughout the disclosure of the invention.

The trainer unit 114 is configured to generate training waveforms and indications, where the indications are provided to the trainee via the display unit 142 for assisting the trainee gradually develop a correct abdominal breathing habit. The training waveforms are generated according to the trainee breathing condition as well as a comparison result obtained by comparing a current abdominal breathing condition of the trainee with an appropriate and corresponding comparison threshold. The comparison threshold will be further described in details later. The sensor unit 112 is configured to directly measure a plurality of abdominal movement signals from the trainee, and the sensor unit 112 is positioned adjacent to an abdomen of the trainee. The data acquisition and conversion unit 132 is electrically coupled to the sensor unit 112 and the trainer unit 114, and is configured to receive the abdominal movement signals of the trainee from the sensor unit 112. The data acquisition and conversion unit 132 further generates a trainee abdominal movement waveform according to the measured abdominal movement signals of the trainee. The sampling rate of the data acquisition and conversion unit 132 is, for example, 200 samples per second, or simply as 200 Hz. The display unit 142 is electrically coupled to the trainer unit 114. The display unit 142 is configured to display or provide the training waveforms and the indications to the trainee, and the trainee follows the training waveforms on the display unit 142 to practice/perform the abdominal breathing.

Referring to FIG. 1, there are two of belts 122 in the abdominal breathing training apparatus 100. The belts 122 are configured for positioning the abdominal breathing training apparatus 100 around a waist of the trainee, where the sensor unit 112 is adjacent to the abdomen of the trainee. However, the invention is not limited thereto, and in other embodiments of the invention, two of belts 122 may be integrated into a single belt so long as the integrated belt can attach the sensor unit 112 in close proximity of the abdominal portion of the trainee. Thus, the sensor unit 112 can directly measure the abdominal movement signals from the trainee.

In the present embodiment, the sensor unit 112 is coupled to the belts 122 and obtains a reference point from the belts 112 so as to directly measure the abdominal movement signals from the trainee. In other embodiments of the invention, the reference point can be obtained from two patches respectively attached/positioned on a front abdomen and the opposite side corresponding to the front abdomen of the trainee. Then, the sensor unit 112 can obtain the reference point from the two patches so as to directly measure the abdominal movement signals from the trainee. However, in practice, embodiments with the belts are more easily implemented. In some embodiments, the sensor unit 112 may be tied to the belts 112, but in other embodiments, the sensor unit 112 may be separate from the belts 122 where the trainee may attach the sensor unit 112 (along with the trainer unit 114 and the data acquisition and conversion unit 132) to the belts 112 when the trainee is about to practice/perform the abdominal breathing.

Figure 3:
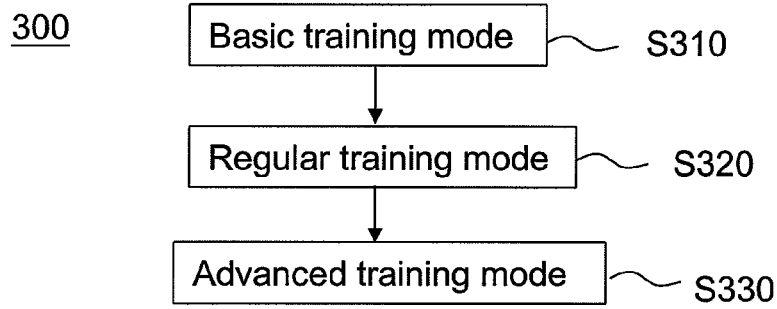
FIG. 3 is a flowchart illustrating an abdominal breathing training method according to an exemplary embodiment of the invention.

In the present embodiment, the abdominal breathing training process may be divided into three main stages as illustrated in FIG. 3. FIG. 3 is a flowchart illustrating an abdominal breathing training method 300 according to an exemplary embodiment of the invention. Referring to FIG. 3, the abdominal breathing training method 300 includes a basic training mode 5310, a regular training mode 5320 and an advanced training mode S330. In the basic training mode S310, the trainer unit 114 is configured to generate a first training waveform. Besides, the display unit 142 is configured to receive the first training waveform from the trainer unit 114 and display the first training waveform to the trainee. In addition, the trainee follows the first training waveform on the display unit 114 to perform a normal breathing in the basic training mode S310.

In the basic training mode S310, the data acquisition and conversion unit 132 is configured to generate a first trainee abdominal movement waveform according to the measured abdominal movement signals of the trainee when the trainee performs the normal breathing in the basic training mode S310. To be more specific, the first training waveform may be a normal breathing practice with a period of four seconds such that the data acquisition and conversion unit 132 generates the first trainee abdominal movement waveform according to the measured abdominal movement signals. The first trainee abdominal movement waveform can be further used for initializing parameters in the regular training mode S320. After the initialization of the regular training mode S320 is completed, the trainer unit 112 provides an assisted abdominal breathing indication to the trainee via the display unit 142 such that the trainee is informed of entering the regular training mode S320. The assisted abdominal breathing indication can be a visible indication or an audio indication.

In the regular training mode 5320, the trainer unit 212 is configured to generate a second training waveform according to the first trainee abdominal movement waveform and an abdominal breathing rule. The abdominal breathing rule comprises a breathing in action for four seconds, a subsequent holding the breath action for four seconds and a further subsequent giving out the breath action for eight seconds. The display unit 142 is configured to receive the second training waveform from the trainer unit 112 and display the second training waveform to the trainee. The trainee follows the second training waveform on the display unit 142 to perform the abdominal breathing. The data acquisition and conversion unit 132 is configured to generate a second trainee abdominal movement waveform according to the measured abdominal movement signals of the trainee when the trainee performs the abdominal breathing.

In the regular training mode 5320, the trainer unit 112 is also configured to statistically analyze the second trainee abdominal movement waveform and the second training waveform, and then determine whether the second trainee abdominal movement waveform is similar to the second training waveform. If the second trainee abdominal movement waveform is determined to be similar to the second training waveform, the trainer unit 112 provides an autonomous breathing indication to the trainee via the display unit 142. The trainee can start the advanced training mode 5330 to perform/practice an autonomous abdominal breathing after the autonomous breathing indication is displayed to the trainee on the display unit 142 or provided to the trainee via the display unit 142. The autonomous breathing indication can be a visible indication or an audio indication. On the contrary, if the second trainee abdominal movement waveform is determined to be not similar to the second training waveform, the trainer unit 112 maintains the abdominal breathing training apparatus 100 operating in the regular training mode 5320 until the trainee is gradually familiar with the abdominal breathing and performing the abdominal breathing correctly.

In the regular training mode 5320, the trainer unit 112 may determine whether the second trainee abdominal movement waveform is similar to the second training waveform by statistically taking correlation coefficients and the root mean squared (RMS) values between the second trainee abdominal movement waveform and the second training waveform. Furthermore, in practice, the trainer unit 112 processes the correlation coefficients and the RMS values by a joint probability in order to make the correlation coefficients result compatible with and the RMS values result since respectively time scales of the correlation coefficients and the RMS values are different. Besides, the result obtained by processing of the joint probability can be compared with a comparison threshold (e.g., the comparison threshold may be between 0.5 and 0.8). If the result is determined to be above the comparison threshold, then the trainer unit 112 determines that the second trainee abdominal movement waveform is similar to the second training waveform.

In the advanced training mode 5330, the data acquisition and conversion unit 132 is configured to generate a third trainee abdominal movement waveform according to the measured abdominal movement signals of the trainee when the trainee performs the autonomous abdominal breathing. To be more specific, the autonomous abdominal breathing refers to the situation where the trainee performs the abdominal breathing without following any visible training waveform on the display unit 142. Also, the autonomous abdominal breathing refers to the situation where the trainee performs the abdominal breathing without any assistance such as receiving instructions from a professional trainer or from a medical practitioner. The trainer unit 114 is configured to statistically analyze the third trainee abdominal movement waveform and the second training waveform, and determine whether the third trainee abdominal movement waveform is similar to the second training waveform. If the third trainee abdominal movement waveform is determined to be similar to the second training waveform, the trainer unit 114 provides a breathing training completion indication to the trainee via the display unit. The breathing training completion indication can be a visible indication or an audio indication. Besides, the trainer unit 112 may determine whether the third trainee abdominal movement waveform is similar to the second training waveform by the similar approaches associated with the correlation coefficients, the RMS values and the corresponding joint probability as illustrated in the regular training mode S320. After the breathing training completion indication is provided to the trainee, the trainee may take off the abdominal breathing training apparatus 100 and starts the abdominal breathing on his/her own pace.

In the present embodiment, the sensor unit 112 can include a piezoelectric (PZT) element (not shown) for acquiring the abdominal movement signals from the trainee. The data acquisition and conversion unit 132 receives the abdominal movement signals from the PZT element and generates the trainee abdominal movement waveform by integrating the measured abdominal movement signals since the PZT element continuously generates transient gradient of the abdominal movements of the trainee. As described previously, the reference point of the trainee abdominal movement waveform can be obtained from the belts 122 or other patches coupled to the sensor unit 112. However, the invention is not limited thereto, and in other embodiments of the invention, the sensor unit 112 may use other techniques or other types of sensors to acquire the abdominal movement signals of the trainee.

The display unit 142 is, for example, a desktop computer, a laptop computer, a portable electronic display device, a liquid crystal display apparatus, a projection display apparatus, a digital multimedia apparatus, an electronic entertainment apparatus, a mobile phone, a watch, a vehicular electronic display apparatus, a mobile communication apparatus, a personal digital assistant and so fourth. Therefore, the trainee can use the abdominal breathing training apparatus 100 to perform/practice the abdominal breathing anywhere and any-time. For example, the trainee can use the abdominal breathing training apparatus 100 to perform/practice the abdominal breathing when he/she is driving a car, taking a bus, taking a train, taking a tram, taking a boat, walking, watching a television or sitting in an office or sitting at home. Apparently, the abdominal breathing training apparatus 100 or the abdominal breathing training method 300 provides an economical and convenient solution for the trainee to gradually develop a correct abdominal breathing habit.

Figure 2:
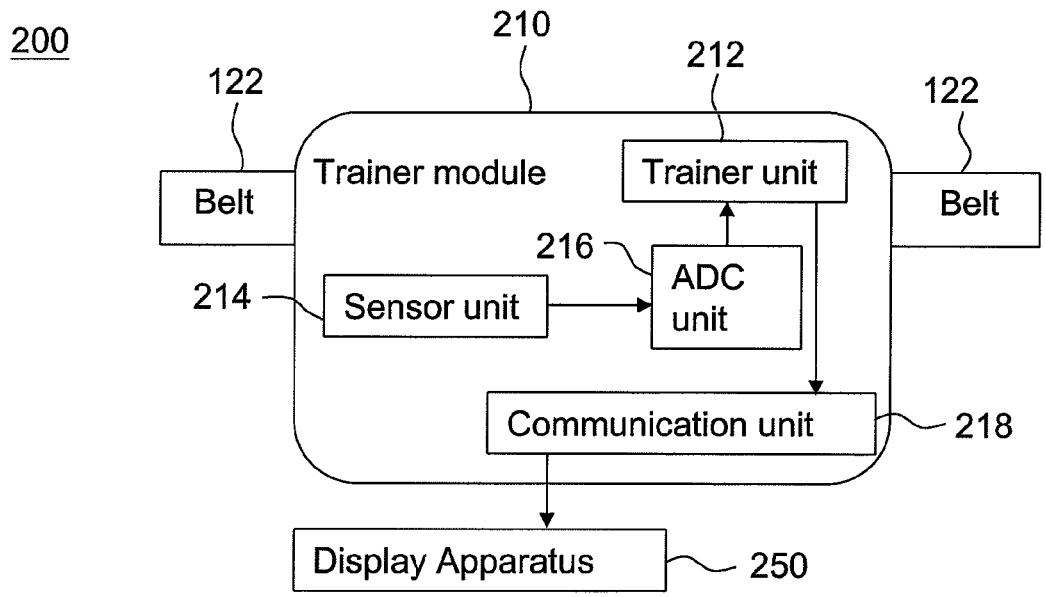
FIG. 2 is a block diagram illustrating an abdominal breathing training system according to an exemplary embodiment of the invention.

FIG. 2 is a block diagram illustrating an abdominal breathing training system 200 according to an exemplary embodiment of the invention. The abdominal breathing training system 200 is similar to the abdominal breathing training apparatus 100 except the abdominal breathing training system 200 supports communication link between several main units of the abdominal breathing training system 200. The abdominal breathing training system 200 includes a trainer 210, a display apparatus 250 and two belts 122. The trainer 210 includes a trainer unit 212, a sensor unit 214, an analog-to-digital conversion (ADC) unit 216 and a communication unit 218.

In the present embodiment, the trainer unit 212 performs similar functions of the trainer 112 of the abdominal breathing training apparatus 100 except that the trainer unit 212 transmits signals/indications/training waveforms to the display apparatus 250 via the communication unit 218. Similar, the sensor unit 214 performs similar functions of the trainer 112 of the abdominal breathing training apparatus 100 except that the measured abdominal movement signals of the trainee is received by the ADC unit 216 which generate the trainee abdominal movement waveform according to the measured abdominal movement signals. The ADC unit 216 performs similar functions of the data acquisition and conversion unit 132 of the abdominal breathing training apparatus 100. The display apparatus 250 receives signals, the training waveforms and the indications from the communication unit 218 by a wireless communication or a wired communication. In addition, the display apparatus 250 is, for example, a desktop computer, a laptop computer, a portable electronic display device, a liquid crystal display apparatus, a projection display apparatus, a digital multimedia apparatus, an electronic entertainment apparatus, a mobile phone, a watch, a vehicular electronic display apparatus, a mobile communication apparatus, a personal digital assistant and so fourth.

In some embodiments, the sensor unit 214 (or even the trainer module 210) may be tied to the belts 122, but in other embodiments, the sensor unit 112 (or the trainer module 210) may be separate from the belts 122 where the trainee may attach the sensor unit 112 (along with other elements of the trainer module 210) or the trainer module 210 to the belts 122 when the trainee is about to practice/perform the abdominal breathing. Besides, similar to the sensor 112 in FIG. 1, the sensor unit 214 obtains reference point from the belts 122. After the abdominal breathing training apparatus 100 and the abdominal breathing training system 200 are introduced, details of an abdominal breathing training method will be further described below in accordance with FIG. 3 to FIG. 6.

Figure 4:
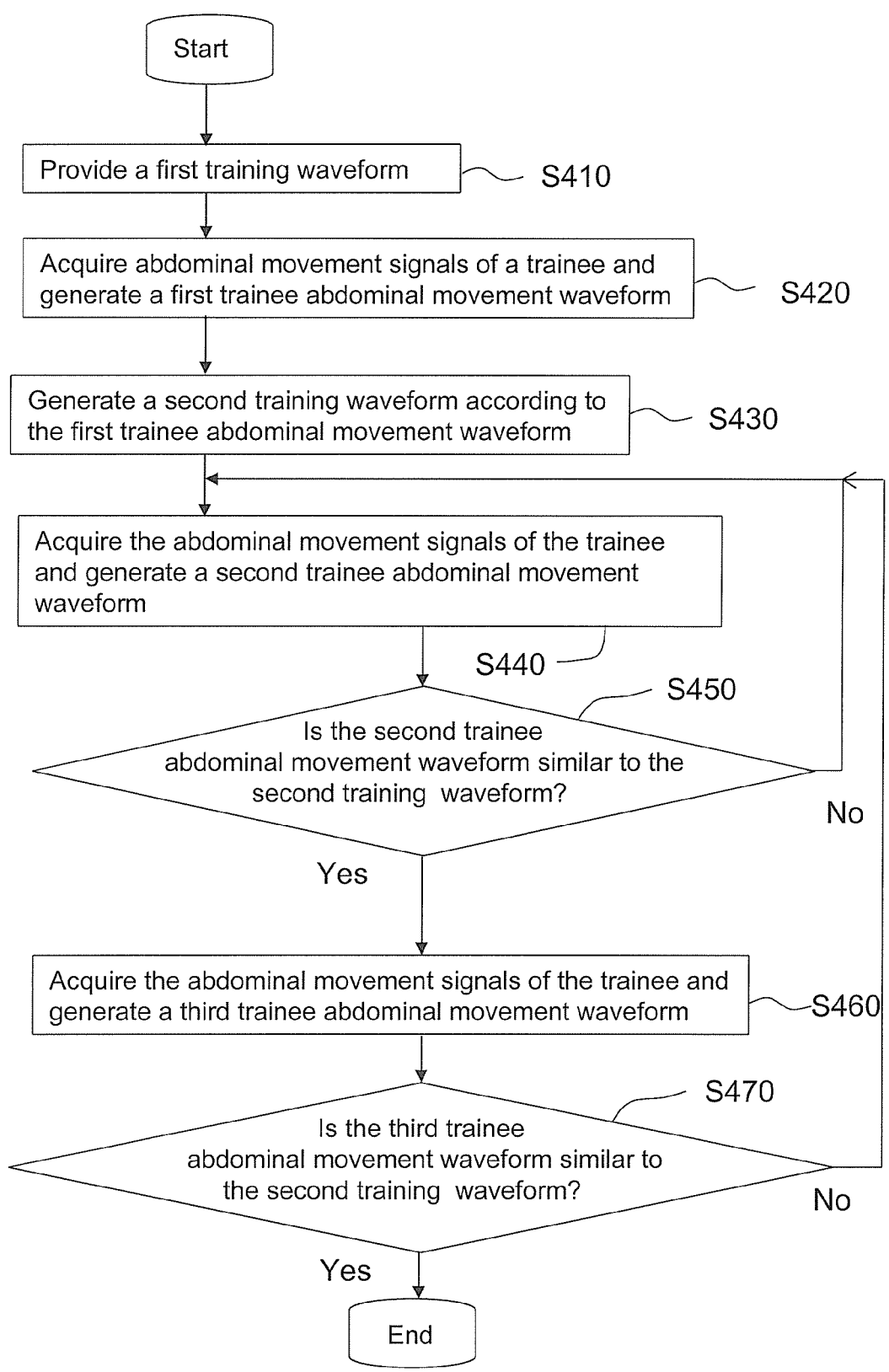
FIG. 4 is a flowchart illustrating another abdominal breathing training method according to another exemplary embodiment of the invention.

FIG. 4 is a flowchart illustrating another abdominal breathing training method 400 according to another exemplary embodiment of the invention. Referring to both FIG. 1 and FIG. 4, the abdominal breathing training method 400 includes the following steps. The abdominal breathing training method 400 starts from step S410. In the step S410, a first training waveform is generated and provided by the trainer unit 114 to the trainee via the display unit 142. Also, a plurality of abdominal movement signals are directly measured from the trainee when the trainee performs a normal breathing. After the step S410 is completed, step S420 is executed. In the step S420, the abdominal movement signals are directly acquired from the trainee when the trainee performs the normal breathing, and a first trainee abdominal movement waveform is generated according to the movement signals. After the step S420 is completed, step S430 is executed. In the step S430, a second training waveform is generated according to the first trainee abdominal movement waveform and an abdominal breathing rule. The abdominal breathing rule includes a breathing in action for four seconds, a subsequent holding the breath action for four seconds and a further subsequent giving out the breath action for eight seconds. After the step S430 is completed, step S440 is executed.

In the step S440, the abdominal movement signals of the trainee are acquired when the trainee performs the abdominal breathing by following the second training waveform on the display unit 142, and the second trainee abdominal movement waveform is generated according to the abdominal movement signals. After the step S440 is completed, step S450 is executed. In the step S450, the trainer unit 114 determines whether the second trainee abdominal movement waveform is similar to the second training waveform. If the second trainee abdominal movement waveform is determined to be similar to the second training waveform, then after the step S450 is completed, step S460 is executed. On the contrary, if the second trainee abdominal movement waveform is determined to be not similar to the second training waveform, then after the step S450 is completed, the abdominal breathing training method 400 returns to execute the step S440.

In the step S460, the abdominal movement signals of the trainee are acquired when the trainee performs the autonomous abdominal breathing (i.e., the abdominal breathing without following any visible training waveform on the display unit 142), and the third trainee abdominal movement waveform is generated according to the abdominal movement signals. In other words, the trainee performs the abdominal breathing on himself/herself. After the step S460 is completed, step S470 is executed. In the step S470, the trainer unit 114 determines whether the third trainee abdominal movement waveform is similar to the second training waveform. If the third trainee abdominal movement waveform is determined to be similar to the second training waveform, then after the step S470 is executed, the abdominal breathing training method 400 is terminated. On the contrary, if the third trainee abdominal movement waveform is determined to be not similar to the second training waveform, then after the step S470 is completed, the abdominal breathing training method 400 returns to execute the step S440 for performing the abdominal breathing again by following the second training waveform on the display unit 142.

Figure 5:
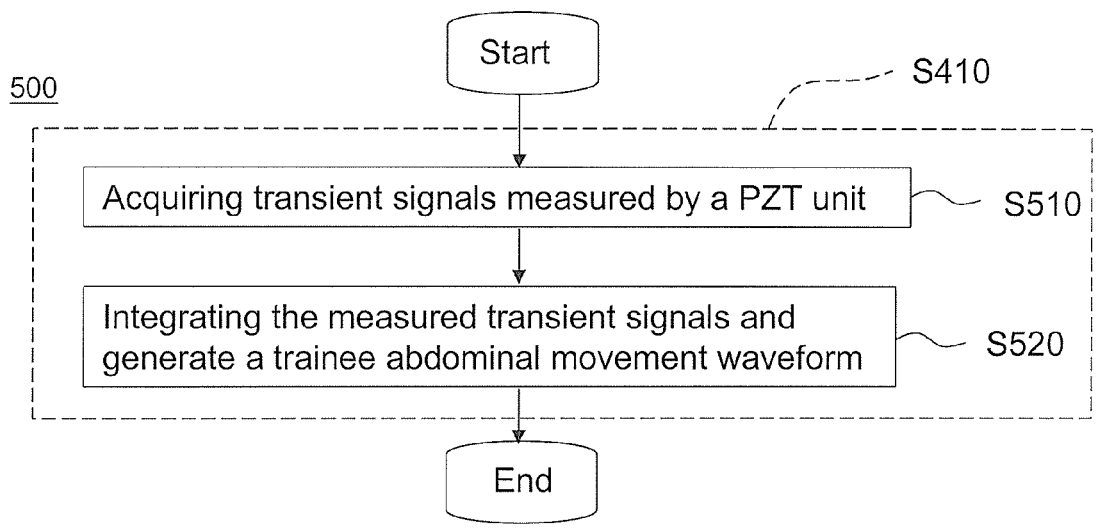
FIG. 5 is a flowchart illustrating a method of directly acquiring abdominal movement waveform of a trainee according to an exemplary embodiment of the invention.

FIG. 5 is a flowchart illustrating a method of directly acquiring abdominal movement waveform of a trainee according to an exemplary embodiment of the invention. Referring to FIG. 5, a method 500 further describes the step S410 in more details. In step S510, transient signals of the abdominal movements of the trainee are continuously measured by a PZT unit (of the sensor unit 112). After the step S510 is completed, step S520 is executed. In the step S520, the measured transient signals are sampled and integrated, and the trainee abdominal movement waveform is generated according to the integrated measured transient signals (by the data acquisition and conversion unit 132). After the step S520 is completed, the method 500 is terminated. However, the invention is not limited thereto, and in other exemplary embodiments, the abdominal breathing training method 400, the abdominal breathing training apparatus 100 and the abdominal breathing training system 200 can use other approaches to acquire the abdominal movement waveforms of the trainee.

Figure 6:
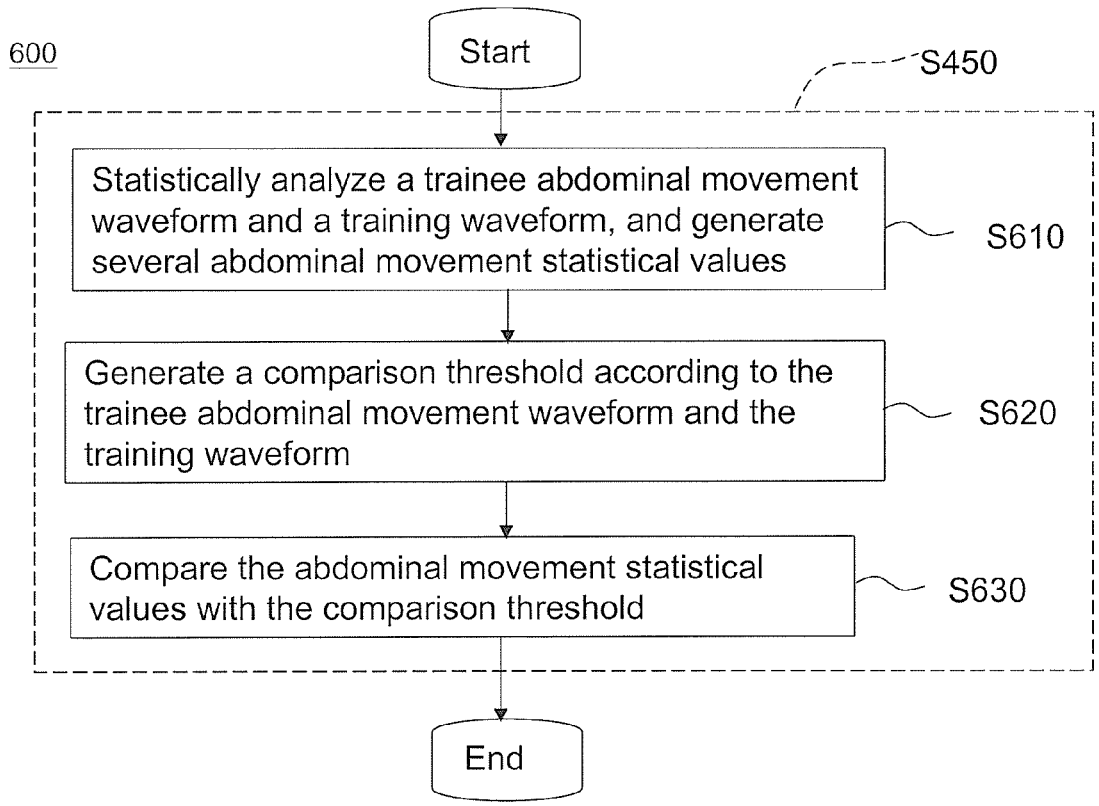
FIG. 6 is a flow chart illustrating a method of determining a successful abdominal breathing exercise according to an exemplary embodiment of the invention.

FIG. 6 is a flowchart illustrating a method of determining a successful abdominal breathing exercise according to an exemplary embodiment of the invention. Referring to FIG. 6, a method 600 further describes the step S450 in more details. In step S610, the trainee abdominal movement waveform and the training waveform are statistically analyzed by the trainer unit 114, and several abdominal movement statistical values are generated. The abdominal movement statistical values are, for example, the correlation coefficients and the RMS values between the trainee abdominal movement waveform and the training waveform. After the step S610 is completed, step S620 is executed. In the step S620, the comparison threshold is generated by the trainer unit 114 according to the trainee abdominal movement waveform and the training waveform. Since there is a variation between human bodies and abdominal movements of different people, the comparison threshold may be adjusted according to the trainee abdominal movement waveform but still limited within an appropriate deviation range of the training waveform. After the step S620 is completed, step S630 is executed. In the step S630, the abdominal movement statistical values are compared with the comparison threshold. In other words, a resultant value obtained by another processing of the abdominal movement statistical values is acquired, and the resultant value is compared with the comparison threshold. If the resultant value is above the comparison threshold, then the abdominal breathing exercise performed by the trainee is determined to be successful. After the step S630 is executed, the method 600 is terminated.

In summary, the breathing training apparatus, the breathing training system and the method thereof proposed by the invention generates and provides training waveforms to the trainee for guiding the trainee to develop the abdominal breathing habit. Besides, current abdominal movement waveform is directly measured from the trainee and compared with a regular abdominal breathing waveform to determine the abdominal breathing condition of the trainee. Moreover, a training interface is provided to assist the trainee adjust his/her own abdominal breathing condition. Thus, the trainee may gradually and correctly develop the abdominal breathing habit on his/her own pace.

It will be apparent to those skilled in the art that various modifications and variations of the exemplary embodiments can be made to the structure of the invention without departing from the scope or spirit of the invention. In view of the foregoing descriptions, it is intended that the present disclosure covers modifications and variations of the exemplary embodiments if they fall within the scope of the following claims and their equivalents.

What is claimed is:

1. An abdominal breathing training apparatus, adapted for training a trainee how to perform an abdominal breathing, comprising:
   a belt configured for positioning the abdominal breathing training apparatus around the waist of a trainee and is in close proximity of the abdominal position of the trainee;
   a sensor unit, disposed in the belt and configured for directly measuring a plurality of abdominal movement signals from the trainee, wherein the sensor unit is positioned securely adjacent to the abdominal portion of the trainee;
   a data acquisition and conversion unit, electrically coupled to the sensor unit, configured for generating a first trainee abdominal movement waveform according to a measured abdominal movement signals when the trainee performs a normal breathing,
   generating a second trainee abdominal movement waveform according to a measured abdominal movement signals of the trainee when the trainee performs an abdominal breathing,
   and generating a third trainee abdominal movement waveform according to a measured abdominal movement signals of the trainee when the trainee performs an abdominal breathing without following any kind of instruction;
   a trainer unit, configured for:
   generating a first training waveform for a normal breathing,
   generating a second training waveform according to the first trainee abdominal movement waveform and an abdominal breathing rule, wherein if the second trainee abdominal movement waveform is determined to be similar to the second training waveform, the trainer unit provides an autonomous breathing indication to the trainee, and
   determining whether the third trainee abdominal movement waveform is similar to the second training waveform, wherein if the third trainee abdominal movement waveform is determined to be similar to the second training waveform, the trainer unit terminates the training by providing a breathing training completion indication to the trainee via a display unit; and
   the display unit, electrically coupled to the trainer unit, configured for displaying the training waveforms and the indications to the trainee, wherein the trainee follows the training waveforms on the display unit to perform the abdominal breathing.

2. The abdominal breathing training apparatus according to claim 1 further comprising:
   the display unit, configured for displaying the first training waveform to the trainee, wherein the trainee follows the first training waveform on the display unit to perform the abdominal breathing.

3. The abdominal breathing training apparatus according to claim 2 further comprising:
   the trainer unit, configured for generating the second training waveform according to the first trainee abdominal movement waveform and the abdominal breathing rule, wherein the abdominal breathing rule comprises a breathing in action for a few seconds, a subsequent holding the breath action for a few seconds and a further subsequent giving out the breath action for a few seconds;
   the display unit, configured for displaying the second training waveform to the trainee, wherein the trainee follows the second training waveform on the display unit to perform the abdominal breathing; and
   the data acquisition and conversion unit, configured for generating the second trainee abdominal movement waveform by following the second training waveform on the display unit.

4. The abdominal breathing training apparatus according to claim 3 further comprising:
   the trainer unit, configured for statistically analyzing the second trainee abdominal movement waveform and the second training waveform.

5. The abdominal breathing training apparatus according to claim 3 further comprising:

the data acquisition and conversion unit, configured for generating third trainee abdominal movement waveform after the autonomous breathing indication is provided to the trainee; and the trainer unit, configured for statistically analyzing the third trainee abdominal movement waveform and the second training waveform.

6. The abdominal breathing training apparatus according to claim 1, wherein the sensor unit comprises a piezoelectric element for acquiring the abdominal movement signals of the trainee, and the data acquisition and conversion unit generates the trainee abdominal movement waveform by integrating the measured abdominal movement signals of the trainee.

7. An abdominal breathing training system, adapted for training a trainee how to perform an abdominal breathing, comprising:

a belt configured for positioning the abdominal breathing training system around the waist of a trainee and is in close proximity of the abdominal position of the trainee;

a sensor unit, disposed in the belt and configured for directly measuring a plurality of abdominal movement signals from the trainee, wherein the sensor unit is positioned securely adjacent to the abdominal portion of the trainee;

an analog-to-digital conversation unit, electrically coupled to the sensor unit, configured for generating a first trainee abdominal movement waveform according to a measured abdominal movement signals of the trainee when the trainee performs a normal breathing, generating a second trainee abdominal movement waveform according to a measured abdominal movement signals of the trainee when the trainee performs an abdominal breathing, and generating a third trainee abdominal movement waveform according to a measured abdominal movement signals of the trainee when the trainee performs an abdominal breathing without following any kind of instruction;

a trainer unit, configured for:

generating a first training waveform for a normal breathing, generating a second training waveform according to the first trainee abdominal movement waveform and an abdominal breathing rule, wherein if the second trainee abdominal movement waveform is determined to be similar to the second training waveform, the trainer unit provides an autonomous breathing indication to the trainee, and determining whether the third trainee abdominal movement waveform is similar to the second training waveform, wherein if the third trainee abdominal movement waveform is determined to be similar to the second training waveform, the trainer unit terminates the training by providing a breathing training completion indication to the trainee via a display unit;

a communication unit, electrically coupled to the trainer unit, configured for transmitting the training waveforms and the indications from the trainer unit to the display unit; and the display unit, electrically coupled to the trainer unit, configured for displaying the training waveforms and the indications to the trainee, wherein the trainee follows the training waveforms on the display unit to perform the abdominal breathing.

8. The abdominal breathing training apparatus according to claim 7 further comprising:

the display unit, configured for displaying the first training waveform to the trainee, wherein the trainee follows the first training waveform on the display apparatus to perform a normal breathing.

9. The abdominal breathing training apparatus according to claim 8 further comprising:

the trainer unit, configured for generating the second training waveform according to the first trainee abdominal movement waveform and an abdominal breathing rule, wherein the abdominal breathing rule comprises a breathing in action for a few seconds, a subsequent holding the breath action for a few seconds and a further subsequent giving out the breath action for a few seconds;

the display unit, configured for displaying the second training waveform to the trainee, wherein the trainee follows the second training waveform on the display apparatus to perform the abdominal breathing; and the analog-to-digital conversion unit, configured for generating the second trainee abdominal movement waveform by following the second training waveform on the display apparatus.

10. The abdominal breathing training apparatus according to claim 9 further comprising:

the trainer unit, configured for statistically analyzing the second trainee abdominal movement waveform and the second training waveform, and providing an autonomous breathing indication to the trainee via the display unit.

11. The abdominal breathing training apparatus according to claim 10 further comprising:

the analog-to-digital conversion unit, configured for generating the third trainee abdominal movement waveform according to the measured abdominal movement signals of the trainee after the autonomous breathing indication is provided to the trainee; and the trainer unit, configured for statistically analyzing the third trainee abdominal movement waveform and the second training waveform, and providing a breathing training completion indication to the trainee via the display unit.

12. The abdominal breathing training apparatus according to claim 7, wherein the sensor unit comprises a piezoelectric element for acquiring the abdominal movement signals of the trainee, and the data acquisition and conversion unit generates the trainee abdominal movement waveforms by integrating the measured abdominal movement signals of the trainee.

13. The abdominal breathing training apparatus according to claim 7, wherein the display apparatus receives the training waveforms and the indications from the communication unit by a wireless communication or a wired communication.

14. An abdominal breathing training method, adapted for training a trainee on how to perform an abdominal breathing, comprising:

directly measuring a first trainee abdominal movement waveform according to a measured abdominal movement signals when the trainee performs a normal breathing, a second trainee abdominal movement waveform according to a measure abdominal movement signals of the trainee when the trainee performs an abdominal breathing, and a third trainee abdominal movement waveform according to a measured abdominal movement signals of the trainee when the trainee performs an abdominal breathing without following any kind of instruction;

generating a first training waveform for a normal breathing, generating a second training waveform according to the first trainee abdominal movement waveform and an abdominal breathing rule, wherein if the second trainee abdominal movement waveform is determined to be similar to the second training waveform, a trainer unit provides an autonomous breathing indication to the trainee, and determining whether the third trainee abdominal movement waveform is similar to the second training waveform, wherein if the third trainee abdominal movement waveform is determined to be similar to the second training waveform, the trainer unit terminates the training by providing a breathing training completion indication to the trainee via a display unit;

and displaying or providing the training waveforms and the indications to the trainee, wherein the trainee follows the training waveforms to perform the abdominal breathing.

15. The abdominal breathing training method according to claim 14 further comprising:

displaying the first training waveform to the trainee on a display apparatus, wherein the trainee follows the first training waveform on the display apparatus to perform a normal breathing.

16. The abdominal breathing training method according to claim 15 further comprising:

generating a second training waveform according to the first trainee abdominal movement waveform and the abdominal breathing rule, wherein the abdominal breathing rule comprises a breathing in action for a few seconds, a subsequent holding the breath action for a few seconds and a further subsequent giving out the breath action for a few seconds;

displaying the second training waveform on the display apparatus to the trainee, wherein the trainee follows the second training waveform on the display apparatus to perform the abdominal breathing; and generating the second trainee abdominal movement waveform by following the second training waveform on the display apparatus.

17. The abdominal breathing training method according to claim 16 further comprising:

statistically analyzing the second trainee abdominal movement waveform and the second training waveform, and providing an autonomous breathing indication to the trainee via the display unit.

18. The abdominal breathing training method according to claim 17 further comprising:

generating the third trainee abdominal movement waveform according to the measured abdominal movement signals of the trainee after the autonomous breathing indication is provided to the trainee; and statistically analyzing the third trainee abdominal movement waveform and the second training waveform, and providing a breathing training completion indication to the trainee via the display unit.

19. The abdominal breathing training method according to claim 14, wherein the abdominal movement signals of the trainee are acquired by a piezoelectric element and the trainee abdominal movement waveform is generated by integrating the measured abdominal movement signals of the trainee.

\* \* \* \* \*